Patented Nov. 3, 1942

2,301,044

UNITED STATES PATENT OFFICE 2,301,044

CATALYZED HYDROCARBON REACTION

Llewellyn Heard, Hammond, Ind., and Alex G. Oblad, Chicago, Ill., assignors to Standard Oil Company, Chicago, Ill., a corporation of Indiana Application September 13, 1939, Serial No. 294,780

6 Claims. (Cl. 196—50)

This invention relates to the manufacture of high knock rating motor fuels and in particular to the conversion of petroleum naphthas of low knock rating into gasoline having a high content of aromatic hydrocarbons.

It is an object of our process to produce aromatic hydrocarbons from aliphatic hydrocarbons in a single catalytic operation which we term dehydro-aromatization. Another object of the invention is to produce gasoline of high knock rating suitable for high compression engines by conducting the vapors of petroleum naphthas containing a large amount of open-chain and other aliphatic hydrocarbons into contact with an aromatizing catalyst at a high temperature in the presence of hydrogen for a sufficient time of contact to permit substantial conversion of the open-chain hydrocarbons into aromatic hydrocarbons with elimination of hydrogen. Naphthenic hydrocarbons are also converted to aromatics by our process. A more specific object of the invention is to produce high knock rating gasoline by recycling a substantial portion of the reaction products resulting from this type of catalytic reaction back through the catalyst zone whereby numerous advantages are obtained, viz:

1. The concentration of hydrogen throughout the catalyst mass is substantially equalized.

2. The temperature of the catalyst mass is regulated more uniformly than is possible without recycling.

3. The recycled products may be heated before reintroducing into the catalyst zone thereby compensating for loss of heat from the endothermic reaction.

4. The velocity of the gases and vapors passing through the catalyst zone is increased thereby resulting in a more rapid equilibrium between the vapor and gas stream and the conversion products on the surface of the catalyst with the result that extreme conversion of hydrocarbons, for example, degradation to carbon and hydrogen, is avoided.

5. Superactive catalyst centers are partially deactivated by adsorption of recycled highly aromatic products with the result that less degradation of the paraffinic hydrocarbons takes place on these centers.

Figure 1:
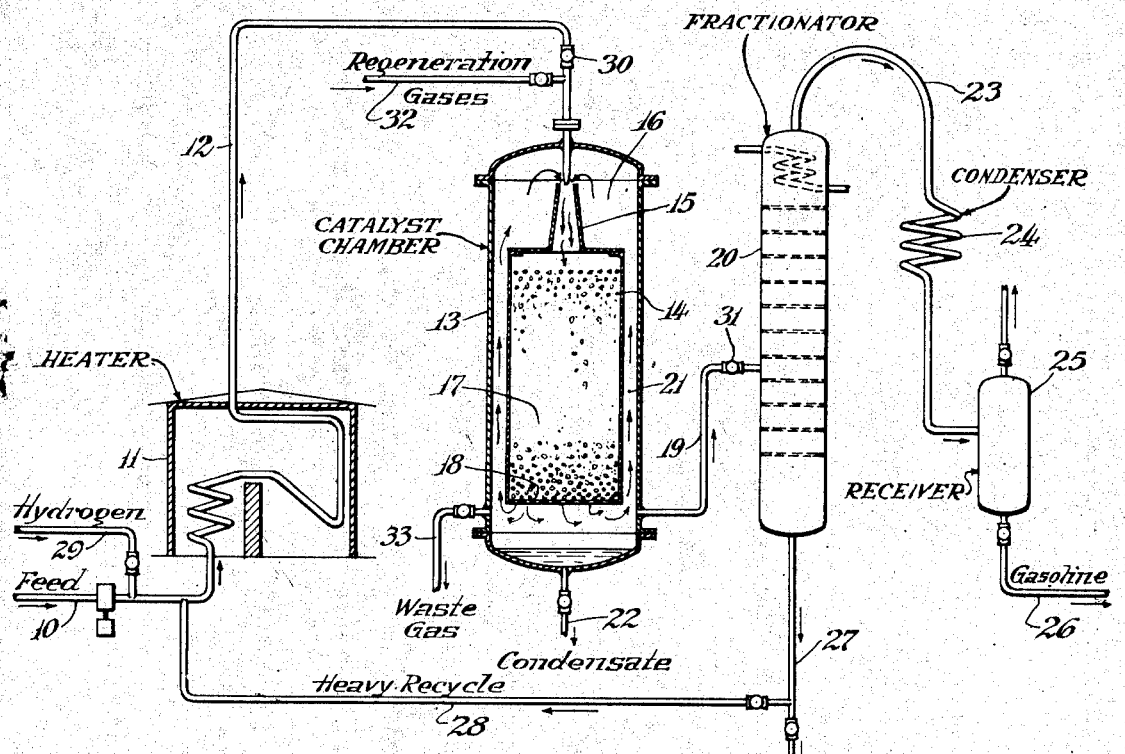
Figure 2:
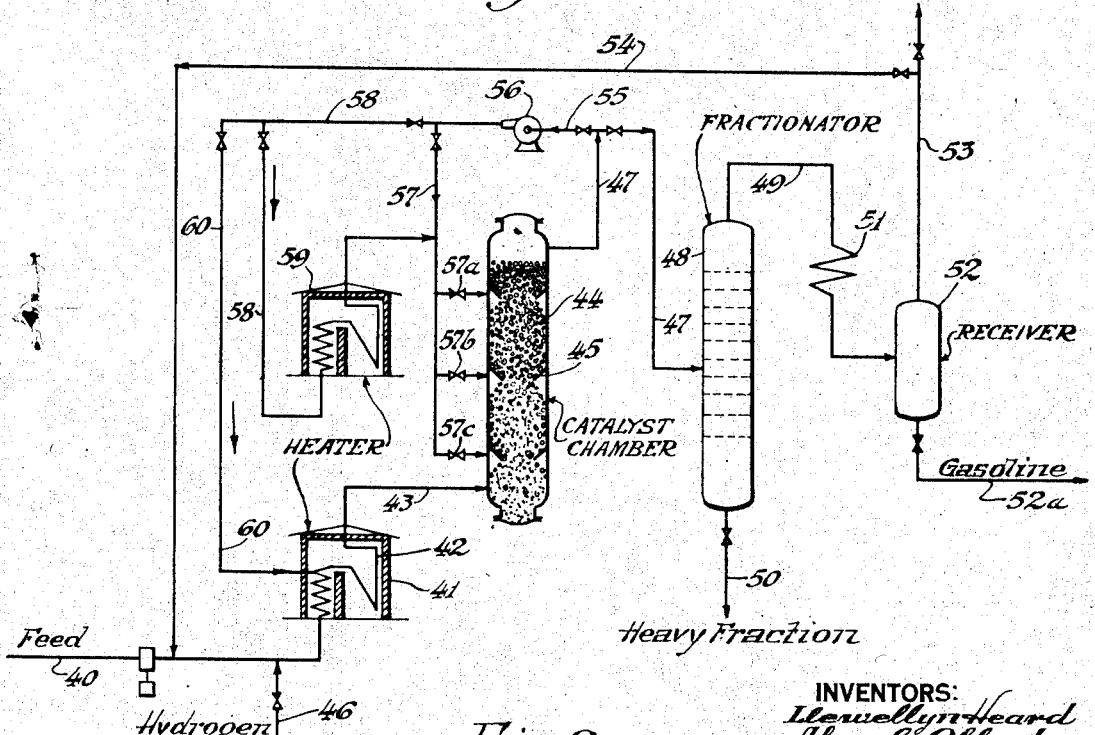

The invention will be described with the help of the accompanying drawing in which Figure 1 shows in simple diagrammatic form an apparatus for carrying out the reaction in which all of the recycling of products occurs within the conversion chamber. Figure 2 shows an alternative arrangement according to which the reaction products from the catalyst zone are recycled externally and also through an external heater, if desired.

Referring to the drawing, Figure 1, feed stock which is preferably a naphtha fraction consisting principally of hydrocarbons having from 6 to 12 carbon atoms is introduced by line 10 into heater 11 where it is heated to a conversion temperature of about 850 to 1000° F. or 1100° F. and preferably 875 to 1025° F. The naphtha vapors are conducted by line 12 into reaction chamber 13 within which is located catalyst container 14. The naphtha vapors enter the catalyst container 14 through venturi 15 which is arranged to draw in additional vapors from the vapor space 16 and force the mixture of vapors through the catalyst in container 14.

The mixture of vapors passes down through the catalyst 17 in container 14 and through the perforated bottom 18 whence the vapors escape from the converter by line 19 leading to fractionator 20. Of all the vapors passing through the catalyst, about 50 to 95%, preferably 60 to 75%, may be recycled through the annular passage 21 lining the catalyst chamber 14. Any condensate which may form in chamber 13 is withdrawn by a drag line 22.

In fractionator 20 the desired gasoline is separated from heavier polymerization products and the gasoline vapors are conducted by line 23 to condenser 24 communicating with receiver 25, the gasoline being withdrawn by line 26. Higher boiling products of the reaction are withdrawn from fractionator 20 by line 27 and may be discharged from the system, or, if desired, the heavier products may be recycled by line 28 back to the heater 11 for further decomposition.

At the start of the process it is often desirable to introduce through line 29 into heater 11 with the naphtha feed, a controlled amount of hydrogen gas to facilitate the catalyst reaction and build up the desired concentration of hydrogen in the recycled products. After the operation has become established, however, the hydrogen may be omitted, sufficient hydrogen being contained in the recycling gases within chamber 13 to effect the desired catalytic reaction. Although added hydrogen is not essential to the operation of the process, it is important to have sufficient hydrogen present in the catalyst to maintain a high catalyst activity and prevent accumulation of carbonaceous materials on the catalyst. When hydrogen is being introduced into the feed stock at 10, it is not so essential to maintain the high recycle ratio within 13 as is otherwise the case. Recycle ratios, expressed as the weight fraction of recycled stock in the total feed to the catalyst, may be about 0.5 to 0.95.

When the catalyst has become sufficiently deactivated to warrant it, the operation is suspended, preferably by diverting the hydrocarbon vapors to a second alternative reaction chamber. Valves 30 and 31 are closed and hydrocarbons are swept out of the exit chamber by means of steam or other inert gas introduced through line 32, passing out through line 33. Heated air or other oxidizing gas of controlled oxygen concentration is then introduced through line 32 and passes through the catalyst bed in container 14, the waste gases flowing out through line 33. The amount of oxygen in the oxidizing gas is controlled to prevent excessive heating of the catalyst from the combustion of carbonaceous materials therein. It is usually desirable that the temperature of the catalyst be kept below 1100° F. Inn the case of certain catalysts, however, it is possible to regenerate them at temperatures as high as 1500° F. without serious loss in catalytic activity. During the regeneration operation, it is desirable to employ the same Venturi effect for recycling gases within the chamber 13, thereby assisting the temperature control. Recycling spent regenerating gases in this manner also assists in controlling the temperature of the catalyst mass. Pressures from atmospheric up to 100 pounds per square inch or more may be used in the regeneration step.

In the hydrocarbon conversion operation, it is desirable to employ pressures within the catalyst chamber of about 30 to 250 pounds per square inch, although pressures as high as 450 pounds per square inch may be used successfully. Still higher pressures than these are definitely undesirable as they result in consumption of hydrogen, in decrease of aromatization and the formation of hydrocarbons having low knock rating. The catalysts employed are preferably granular solid materials which adapt themselves to packing loosely within the catalyst container 14 to provide a porous bed. The preferred catalysts are oxides of the metals found in the left columns of groups IV, V and VI of the periodic system. Examples of such compounds are chromium, molybdenum, and tungsten oxides, vanadium oxide, and titanium, cerium and thorium oxides. These oxides may suitably be deposited on a bauxite or alumina support, for example, by impregnating the granular alumina with a salt of the metal, such as the nitrate, and subsequently converting it to the oxide. Chromium nitrate may thus be deposited on alumina or in another example, ammonium molybdate or chromate may be deposited on alumina and thereafter subjected to heating to convert the salt to the desired oxide.

The rate of passing the fresh naphtha feed into the catalyst bed is preferably controlled within the limits of about 0.1 or 0.2 to 25, preferably 0.5 to 20 time factor, the time factor being the hours required to pass a unit volume of liquid naphtha feed through a unit volume of gross catalyst space. A time factor of about 1 is generally satisfactory.

Referring now to Figure 2, hydrocarbon feed stock comprising gasoline or naphtha, for example, a midcontinent heavy naphtha boiling within the range of 250 to 425° F., is introduced by line 40 to pipe furnace 41. The naphtha is vaporized and heated to a high temperature in coil 42 and then passes by transfer line 43 to catalyst chamber 44. The hot vapors may be suitably introduced into the catalyst chamber below inclined baffles 45 thus providing more uniform contact with the granular solid catalyst. The catalyst which has been previously described may suitably be in the form of granules of about 10 to 50 mesh and the temperature of the catalyst may be regulated within the range previously set forth, i. e., about 875 to 1025° F. Hydrogen may be added to the hydrocarbon stream by line 46 when desired.

The vaporous products leave the catalyst chamber by line 47 and are conducted to fractionator 48 where they are separated into an overhead gasoline fraction, withdrawn by line 49, and a heavier than gasoline fraction, withdrawn by line 50. The gasoline fraction may be condensed in condenser 51 and separated by separator 52 and gasoline discharge line 52a. Fixed gases are conducted from the system by vent 53 or recycled to the system by line 54. Gases thus recycled, consisting essentially of hydrogen and hydrocarbon gases including methane, ethane, ethylene, propane and propylene, may be introduced into the hydrocarbon feed by line 40. When recycling these hydrogen-containing gases, we may avoid adding fresh hydrogen by line 46.

A substantial portion of the hot vapors leaving chamber 44 by line 47 is recycled by line 55, blower 56, and line 57 back to the catalyst chamber 44 into which it may be introduced by one or more communicating lines 57a, 57b and 57c. The amount of reaction products thus recycled may suitably be about 1 to 4 times the amount of fresh hydrocarbons introduced to the catalyst by line 43. We may also recycle the reaction products to line 58 and heater 59 wherein the products may be heated to a temperature somewhat higher, for example, 25 to 100° F. above that employed in the catalyst chamber 44. In this maner we may maintain the desired reaction temperature in catalyst chamber 44 without the application of indirect heating or the necessity of preheating the feed stock in heater 41 to an excessive temperature where undesirable thermal cracking becomes extensive. Thus where it is desired to maintain the catalyst in chamber 44 at a temperature of 950° F., we may heat the recycle vapors to the temperature of 975° F. and also introduce the naphtha vapors from heater 41 at this same temperature, thus providing 25 degrees of superheat to compensate for loss of temperature during the catalytic reaction.

Instead of employing a separate heater 59 for heating recycle products, we may recycle these products through valved line 60 directly to the naphtha heater 41 and in this case we prefer to introduce the recycled products into coil 42 at an intermediate point thereof where the temperature of the coil is substantially that of the products recycled. The catalyst in 44 may be arranged either in a fixed bed as shown or in a moving bed. In a moving bed, means are provided at the top and the bottom of the catalyst chamber 44 to continuously or intermittently introduce and discharge the granular catalyst as it becomes spent in the operation. This involves the use of valve sealing means to admit and remove catalyst and to prevent escape of the vapors from the catalyst chamber. Where a moving bed catalyst is employed, regeneration of the catalyst may be effected in auxiliary equipment, whereas in the case of a fixed bed catalyst, regeneration is more conveniently carried out in situ. The catalyst when spent is subjected to the action of an oxidizing gas as previously described by means not shown in Figure 2.

As previously indicated, in the aromatization of naphthas by catalysts, it is important to maintain a desired hydrogen concentration in the catalyst in order to minimize carbonization of the catalyst which would result from hydrogen deficiency. At the same time, it is important to avoid excessive hydrogen partial pressure such as that employed in typical high pressure hydrogenation reactions where hydrogen pressures of 1000 to 4000 lbs. per square inch are commonly used. In our process the recycled products contain sufficient hydrogen to prevent undesirable carbon deposition and deactivation of the catalyst. Thus, the hydrogen in the recycled products may be about 40 to 80%, based on the fixed gases present. In the case of fresh catalyst, the hydrogen concentration of the gas produced in the process will be considerably higher than after the catalyst has become partially spent. This effect is apparently due to the diminishing dehydrogenation activity of the catalyst which permits cracking reactions producing methane and other fixed gases to become more predominant. The life of a catalyst in this operation will vary considerably, depending upon the stock used as well as the catalyst employed. With a typical chromium oxide on alumina catalyst, the life of the catalyst may be about 10 to 20 hours after which regeneration is required.

It should be understood that our process is strictly a dehydrogenation process and not a hydrogenation process inasmuch as there is an overall net production of hydrogen. That is, even though some hydrogen be added at 46, the amount of hydrogen discharged in the gases at 53 is larger. If a portion of the gases produced in the process be stored, it may be used at the beginning of each succeeding run with fresh catalyst, thus entirely avoiding the need for fresh hydrogen. Once the catalytic aromatizing reaction has become established, sufficient hydrogen will be obtained from the gases recycled by line 55.

When recycling reaction products through line 58 or line 60 and heaters 59 and 41 respectively, the amount of heat transferred by the gas per unit volume of gas recycled is far greater than would be the case if hydrogen only were recycled. This results from the higher heat capacity of the reaction products and facilitates the maintenance of the desired reaction temperature in catalyst chamber 44. The higher velocity of the vapor stream passing through the catalyst is also conducive to more rapid establishment of equilibrium between the hydrocarbons adsorbed on the surface of the catalyst and the hydrocarbons in the vapor stream with the result that a more selective catalytic reaction takes place than in the case where no recycling of products is practiced. More effective maintenance of catalyst activity is also obtained by use of the higher vapor velocities. Typical of the results which may be obtained by our process, we may charge an East Texas heavy naphtha of about 40 octane number and produce an aromatic gasoline of 75 to 85 octane number, C. F. R. motor method. The concentration of aromatic hydrocarbons including benzene, toluene, xylene, ethyl benzene, etc. may be about 30 to 60% of the product. As previously indicated, we prefer to process a heavy naphtha fraction of petroleum, preferably naphtha from a paraffinic type crude oil. Naphtha of boiling range 175 to 450° F. is suitable, although we usually prefer to treat a naphtha fraction of somewhat narrower range, e. g., 300 to 450° F. Somewhat heavier distillates may be employed, for example, distillates boiling up to 525° F., but if the stock is too heavy, difficulty will be encountered with carbonization and excessive catalyst deactivation resulting in uneconomically short runs between regeneration cycles.

Although we have described our invention with respect to specific embodiments thereof, we intend that it be limited only by the following claims.

We claim:

1. In the process of converting petroleum naphthas of low knock rating to aromatic motor fuels of high knock rating wherein the vapors of said naphthas are continuously contacted with a solid aromatizing catalyst at a high conversion temperature and in the presence of hydrogen, the improvement comprising regulating the conditions of temperature, pressure and time of contact to produce a substantial amount of hydrogen in the reaction products directly recycling in contact with said catalyst, without fractionation or substantial cooling, a portion of the reaction products constituting about 1 to 4 times the amount of fresh naphtha charged to the catalyst and continuously withdrawing a portion of the reaction products and recovering gasoline therefrom.

2. In the process of converting petroleum naphthas of low knock rating to aromatic motor fuels of high knock rating wherein the vapors of said naphthas are continuously contacted with a solid aromatizing catalyst at a high conversion temperature and in the presence of hydrogen, the improvement comprising regulating the conditions of temperature, pressure and time of contact to produce a substantial amount of hydrogen in the reaction products, directly recycling in contact with said catalyst, without fractionation or substantial cooling, a portion of the reaction products constituting a fraction by weight of about 0.5 to 0.95 of the total stock charged to the catalyst, and continuously withdrawing a portion of the reaction products and recovering the gasoline products therefrom.

3. The process of converting open-chain hydrocarbons into aromatic hydrocarbons suitable for antiknock motor fuel, comprising heating a suitable naphtha containing said open-chain hydrocarbons to a high temperature above 875° F., forcing the resulting hydrocarbon vapors under pressure through an aspirating means and a porous bed of aromatizing catalyst, supplying the reaction products from said aromatizing catalyst to said aspirating means, whereby a substantial portion of said products is resubjected to the action of said catalyst, said portion corresponding to a ratio of about 0.5 to 0.95 recycled stock to total feed, withdrawing the remainder of said reaction products and separating therefrom the desired motor fuel fraction.

4. In the process of converting open-chain hydrocarbons into aromatic hydrocarbons wherein open-chain hydrocarbons having 6 or more carbon atoms are subjected in a continuous stream to the action of a solid aromatizing catalyst and wherein the catalyst is disposed in the form of granules in a stationary bed in an elongated unheated passage and the temperature of the catalyst tends to become successively lower throughout said passage because of the endothermic character of the reaction, the improvement comprising maintaining the temperature of said catalyst within a desired operating range of about 875 to 1025° F. by recycling an aliquot portion of the total reaction products from said catalyst contacting operation through a heating means where it is heated to a temperature above that of said catalyst bed and thence directly into the catalyst in conjunction with said hydrocarbons undergoing treatment, the amount of said aliquot portion recycled being about 1 to 4 times the amount of said open chain hydrocarbon stock charged.

5. The process of claim 4 wherein the recycled reaction products are introduced into said catalyst passage at a succession of spaced points.

6. The process of claim 4 wherein the solid aromatizing catalyst employed comprises an oxide of a metal of the left column of group VI of the periodic system.

LLEWELLYN HEARD.
ALEX G. OBLAD.